United States Patent Office 3,004,066
Patented Oct. 10, 1961

3,004,066
OXIDATION OF DIALKYLBENZENES
Emanuel M. Amir, Baytown, Tex., assignor, by mesne assignments, to Esso Research and Engineering Company, Elizabeth, N.J., a corporation of Delaware
No Drawing. Filed Sept. 8, 1958, Ser. No. 759,389
3 Claims. (Cl. 260—524)

This invention relates to a process for the catalytic oxidation of dialkylbenzenes. More particularly, this invention relates to a catalytic liquid phase dialkylbenzene air oxidation process providing an enhanced direct yield of dicarboxylic aromatic acids.

Dicarboxylic acids useful for a wide variety of compositions can be prepared by the oxidation of dialkylbenzenes. Thus, phthalic acid and isophthalic acid are useful raw materials in the preparation of alkyd resins. Terephthalic acid is a useful raw material for the preparation of fiber-forming polyesters. However, when a dialkylbenzene is subjected to catalytic liquid phase oxidation, a wide variety of products are obtained and ordinarily the desired dicarboxylic acid is obtained only in poor yield, the main reaction products being oxidation products involving oxidation of only one of the two alkyl groups present in the xylene.

In accordance with the present invention, however, the liquid phase oxidation of dialkylbenzenes with molecular oxygen is conducted in the presence of a mixed catalyst system providing for an enhanced selectivity to the desired dicarboxylic acid. Briefly, a dialkylbenzene (preferably a dialkylbenzene wherein each alkyl group contains 1 to 4 carbon atoms) is contacted in liquid phase with molecular oxygen in the presence of a catalytically effective amount of a mixture of iron phthalocyanine with an oil-soluble cobalt salt. Preferably, from about 0.2 to 5 mols of cobalt salt are employed per mol of iron phthalocyanine. In general, from about .001 to 10 weight percent of catalyst is employed, based on the dialkylbenzene charge material. The amount of catalyst is calculated on the basis of its metal content.

In some instances, it may be desirable to conduct the oxidation of the dialkylbenzene in solution in a suitable oxygen-resistant solvent such as acetic acid, chlorobenzene, etc.

The reaction temperature should be sufficiently high to initiate the oxidation reaction and yet not so high as to cause thermal decomposition of components of the reaction mixture. Temperatures within the range of about 120° to about 275° C. may be employed with satisfactory results. The reaction time will ordinarily be dependent upon the extent to which the dialkyl starting material is to be converted. It is generally preferable to conduct the reaction for a period of time sufficient to convert from about 20 to about 50 percent of the dialkylbenzene starting material to oxidation products. Thus, reaction times within the range of about 0.5 to 25 hours may be satisfactorily employed with preferred times being within the range of about 2 to 5 hours.

The molecular oxygen may be utilized in purified form or in admixture with non-reactive gases such as nitrogen, etc. The preferred gas is air. The rate of oxygen fed into the reaction mixture relative to the hydrocarbon is in the range of about 0.1 to about 50 mols of oxygen per mol of dialkylbenzene per hour and, more particularly, within the range of about 0.5 to 30.

The process should be conducted under essentially liquid phase conditions so that the hydrocarbon feed stock is not vaporized. Generally, the pressure may be within the range of about atmospheric to about 1500 p.s.i.g.

As indicated, the catalyst is a mixture of iron phthalocyanine with a hydrocarbon soluble cobalt salt. Representative salts of cobalt which may be utilized alone or in admixture may be compounds such as cobalt naphthenate, cobalt stearate, cobalt acetate, cobalt toluate, cobalt acetylacetonate, etc.

The amount of catalyst to be employed, calculated on the combined weight of only the cobalt and iron content of the catalyst, may, for example, be within the range of about 0.001 to about 10 percent by weight, based on the dialkylbenzene starting material. More preferably, from about 0.005 to about 2 weight percent of catalyst is employed.

Among the hydrocarbon starting materials that may be utilized are dimethyl benzenes (i.e., ortho-, meta- and paraxylene), diethyl benzenes, diisopropyl benzenes, dibutyl benzenes, etc. and mixtures thereof. These may be described as primary and secondary dialkyl benzenes.

The invention will be further illustrated by the following specific examples which are given by way of illustration and not as limitations on the scope of this invention.

Example I

A charge consisting of about 200 ml. of metaxylene was added to a glass reactor equipped with reflux condenser and provisions for removing the water formed during the reaction, the reactor being provided with a suitable agitating device. There was also added about 5 mg. cobalt as cobalt naphthenate and about 2 mg. iron as iron phthalocyanine. Thereafter, the reactor was heated to reflux temperature within the range of 134° to 145° C. for about 3½ hours while charging oxygen thereto at the rate of about 12 l. per hour. At the end of this time, about 34 percent of the metaxylene had been converted to oxidation products with a selectivity to isophthalic acid of 10 percent.

When the example was repeated utilizing a catalyst consisting of cobalt naphthenate (in the same total catalyst concentration), at the end of 3½ hours of reaction, it was found that there was about a 39 percent conversion of the metaxylene with a selectivity to isophthalic acid of only about 1.5 percent.

When the catalyst consisted of iron phthalocyanine in the same total catalyst concentration and the example was otherwise repeated, about a 32 percent conversion was obtained after a 3 hour reaction time with a selectivity to isophthalic acid of 5 percent.

Since substantially identical reaction conditions were employed in each of the three above-described runs and since reaction temperature and rates were substantially constant, it is apparent that the difference in selectivity to isophthalic acid is attributable to the differences in the catalyst used and that a synergistic effect is obtained through the use of a cobalt salt with iron phthalocyanine.

When the example is repeated with paraxylene, similar results are obtained.

What is claimed is:

1. In a process for the catalytic liquid phase oxidation of primary dialkyl benzene containing 1 to 4 carbon atoms per alkyl group at a temperature within the range of 120° to 275° C. and at a pressure sufficient to maintain said liquid phase for a time within the range of 0.5 to 25 hours with molecular oxygen in an amount in the range of about 0.1 to about 50 mols of oxygen per mol of dialkylbenzene per hour, the improvement which consists essentially of catalytically effecting said oxidation in the presence of a mixture of iron phthalocyanine with cobalt naphthenate as the catalyst, from about 0.2 to 5 mols of said cobalt naphthenate being employed per mol of iron phthalocyanine.

2. A process as in claim 1 wherein from about 0.001 to about 10 weight percent of catalyst is employed, said percentage being calculated on the basis of the combined weight of cobalt and iron in the catalyst and on the weight of the dialkylbenzene charge.

3. In a process for the catalytic liquid phase oxidation of xylene with molecular oxygen in an amount in the range of about 0.1 to about 50 mols per mol of xylene per hour under oxidation conditions including a temperature within the range of 120° to 275° C. and a pressure within the range of about 0 to 1500 p.s.i.g. for a time within the range of 0.5 to 25 hours, the improvement which consists essentially of catalytically effecting said oxidation in the presence from about 0.001 to about 10 weight percent of a mixture of iron phthalocyanine with cobalt naphthenate in the ratio of about 0.2 to 5 mols of cobalt naphthenate per mol of iron phthalocyanine, said percentage being calculated on the basis of the combined weight of cobalt and iron in the catalyst and on the weight of the xylene charge.

References Cited in the file of this patent

UNITED STATES PATENTS

| | | |
|---|---|---|
| 2,245,528 | Loder | June 10, 1941 |
| 2,552,268 | Emerson et al. | May 8, 1951 |
| 2,552,278 | Hochwalt | May 8, 1951 |
| 2,746,990 | Fortuin et al. | May 22, 1956 |

FOREIGN PATENTS

| | | |
|---|---|---|
| 801,387 | Great Britain | Sept. 10, 1958 |
| 1,120,554 | France | Apr. 23, 1956 |